United States Patent
Cho

Patent Number: 5,847,774
Date of Patent: Dec. 8, 1998

[54] VIDEO SIGNAL PEAKING CIRCUIT

[75] Inventor: Hyun-Duk Cho, Kyeongki-Do, Rep. of Korea

[73] Assignee: Daewoo Electronics Co., Ltd., Seoul, Rep. of Korea

[21] Appl. No.: 821,759

[22] Filed: Mar. 20, 1997

[30]     Foreign Application Priority Data

Oct. 29, 1996  [KR]   Rep. of Korea .................. 1996-49819

[51] Int. Cl.⁶ ....................................................... H04N 5/21
[52] U.S. Cl. ........................... 348/625; 348/627; 348/630; 348/678
[58] Field of Search ..................................... 358/625, 627, 358/630, 631, 707, 678, 665–667, 668–669; H04N 5/21

[56]              References Cited

U.S. PATENT DOCUMENTS

| | | | |
|---|---|---|---|
| 4,069,505 | 1/1978 | Burdick et al. | 348/625 |
| 4,350,995 | 9/1982 | Harlan | 358/37 |
| 4,633,303 | 12/1986 | Nagasaki et al. | 358/98 |
| 4,842,457 | 6/1989 | Yamagata | 358/31 |
| 5,051,818 | 9/1991 | Mishima | 358/31 |
| 5,243,421 | 9/1993 | Nagata et al. | 348/445 |
| 5,285,267 | 2/1994 | Lim | 348/663 |
| 5,335,021 | 8/1994 | Sawada | 348/664 |
| 5,543,859 | 8/1996 | Miyata et al. | 348/625 |

FOREIGN PATENT DOCUMENTS 0 342 511  11/1989  European Pat. Off. .
35 30 759   4/1986  Germany .

*Primary Examiner*—Andrew I. Faile
*Assistant Examiner*—Reuben M. Brown
*Attorney, Agent, or Firm*—Pillsbury Madison & Sutro LLP

[57]              ABSTRACT

A circuit for peaking video signals, which can be developed by combining a video signal with a peaking signal having a preshooting and a overshooting potion that are respectively controlled in peaking levels thereof. The circuit includes a delay circuit for delaying a luminance signal for a first predetermined time in order to generate a first delayed signal and for delaying the first delayed signal for a second predetermined time in order to generate a second delayed signal. An adder adds the second delayed signal to a current video signal in order to generate an added signal. A variable amplifying section amplifies the added signal in response to a first control signal from an exterior in order to generate a first variable amplified signal, and amplifies the added signal in response to a second control signal from the exterior in order to generate a second variable amplified signal. A selecting section compares the added signal from the adder with a reference signal, and selects the first amplified signal or the second amplified signal according to the comparison result. A subtracter subtracts the first amplified signal or the second amplified signal from the select section from the first delayed signal from the delay section in order to generate a subtracted signal as a peaked video signal. Therefore, the circuit can control the preshooting portion and the overshooting portion of the peaking signal used to peak video signals.

10 Claims, 3 Drawing Sheets

FIG. 3A
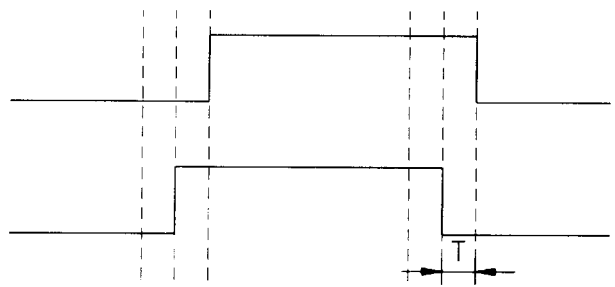
FIG. 3B
FIG. 3C
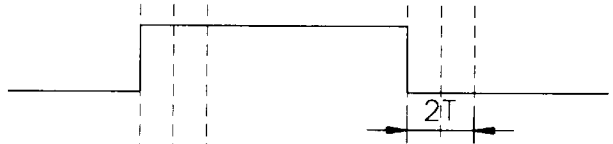
FIG. 3D
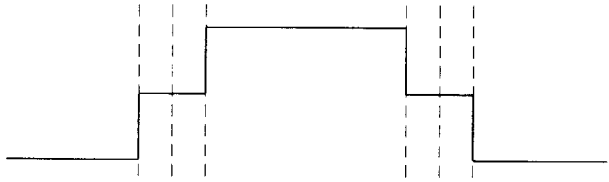
FIG. 3E
FIG. 3F
FIG. 3G
FIG. 3H —— HIGH
           —— LOW
FIG. 3I
FIG. 3J
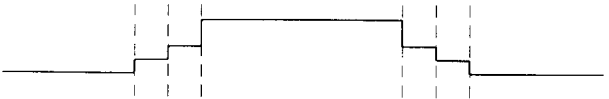
FIG. 3K
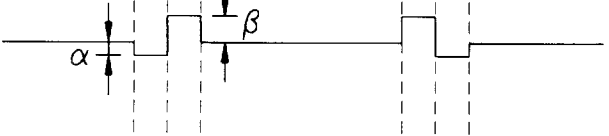

VIDEO SIGNAL PEAKING CIRCUIT

BACKGROUND OF THE INVENTION

1. Field of the Invention

The present invention relates to a circuit for a television system. More particularly, the present invention relates to a video signal peaking circuit for producing a peaking signal, which is added to a video signal in order to enhance an image displayed in a television receiver.

2. Description of the Prior Art

It is known that the response of a video signal processing system, such as one found in a television receiver, may be subjectively improved by increasing the slope or "steepness" of a video signal amplitude transition. The response may also be improved by generating a signal "preshoot" just before an amplitude transition, and a signal "overshoot" just after the amplitude transition, so that black-to-white and white-to-black transitions are accentuated.

FIG. 1 is a block diagram for showing a conventional circuit for peaking video signals. In FIG. 1, the circuit includes a first delay section 121, a second delay section 122, a third delay section 123, a first adder 131, a second adder 132, a subtracter 141, and a variable amplifier 151.

First and second delay sections 121 and 122 delay luminance signals which are continuously inputted through an input terminal 101 for a predetermined time T, respectively.

The delayed signals which are produced by first and second delay section 121 and 122 are respectively outputted to first adder 131 and subtracter 151. Third delay 132 delays the time T delayed luminance signals from second delay section 122 for the time T in order to generate a luminance signal delayed for time 2T. Second adder 132 adds the 2T time delayed luminance signal to a current luminance signal through input terminal 101 so that second adder 132 generates continuously added luminance signals, and second adder 132 provides the added luminance signals to variable amplifier 151. Variable amplifier 151 amplifies the added luminance signals in response to a control signal through a control signal input terminal 102 to generate amplified signals. The amplified signals generated by variable amplifier 151 are provided to subtracter 141. Subtracter 141 subtracts the amplified signals from the T time delayed luminance signals in order to generate subtracted signals which are outputted to first adder 131 as peaking signals. First adder 131 adds the peaking signals from subtracter 141 to the T time delayed luminance signal to generate peaked luminance signals, and outputs the peaked luminance signals to a matrix circuit (not shown) through an output terminal 103.

In the video signal peaking circuit 100, as the amplifying degree of the variable amplifier 150 is controlled by the control signal, the peaking signal 142 from the subtracter 141 is controlled, so that the degree of the peaking luminance signals is controlled.

However, in the video signal peaking circuit 100, when luminance signals are peaked by the control signal, the degree of preshooting and overshooting of the luminance signals is controlled at one level.

U.S. Pat. No. 4,350,995 (issued to Wayne E. Harlan on Sep. 21, 1982) discloses one example of an circuit for peaking video signals. The circuit disclosed in the above U.S. Patent includes a differential amplifier which produces a peaking component at an output, and a signal delay line for determining the frequency at which maximum peaking occurs. The delay line input is coupled to a source of video signals to be peaked and to one input of the delay line output is coupled to another input of the differential amplifier and to a signal combining point. A peaked video signal is produced by combining the peaking component from the differential amplifier with the delayed signal from the delay line. The operating parameters of the peaking circuit are established with respect to a normally expected range of video signal amplitude transitions so that the differential amplifier exhibits a linear response for transient or aperiodic transitions throughout the amplitude transition range. However, the differential amplifier exhibits a non-linear response for periodic transitions recurring at the maximum peaking frequency and having a magnitude greater than half the maximum transition magnitude of the range.

However, in the circuit, the degree of the peaking video signals is controlled at one level in both the preshooting and the overshooting.

For the foregoing reasons, there is need for a video signal peaking circuit that can respectively control peaking levels of the preshooting and the overshooting.

SUMMARY OF THE INVENTION

Therefore, it is an object of the present invention to provide a video signal peaking circuit which is able to respectively control the preshooting and overshooting in peaking video signals.

In order to achieve the above-mentioned object of the present invention, there is provided a video signal peaking circuit, the video signal peaking circuit comprises:

a delay section for delaying a luminance signal for a first predetermined time in order to generate a first delayed signal and for delaying the first delayed signal for a second predetermined time in order to generate a second delayed signal;

an adder for adding the second delayed signal to a current video signal in order to generate an added signal;

a variable amplifying section for amplifying the added signal in response to a first control signal from an exterior in order to generate a first variable amplified signal, and amplifying the added signal in response to a second control signal from the exterior in order to generate a second variable amplified signal;

a selecting section for comparing the added signal from said adder with a reference signal, and for selecting the first amplified signal or the second amplified signal according to the comparison result; and a subtracter for subtracting the first amplified signal or the second amplified signal from said select section from the first delayed signal from said delay section in order to generate a subtracted signal as a peaked video signal.

According to the present invention, the video signal peaking circuit can respectively control the degree of the preshooting and the overshooting portion of the peaking signal used to peak video signals.

BRIEF DESCRIPTION OF THE DRAWINGS

The above objects and advantages of the present invention will become more apparent by describing in detail a preferred embodiment thereof with reference to the attached drawings, in which:

FIGS. 3A through 3K are waveform diagrams for showing the operations at serveral portions of the video signal peaking circuit of FIG. 2.

DESCRIPTION OF THE PREFERRED EMBODIMENT

A description will be given below in detail, with reference to the accompanying drawings, of the circuitry configuration and the operation of the circuitry according to one embodiment of the present invention.

Figure 1:
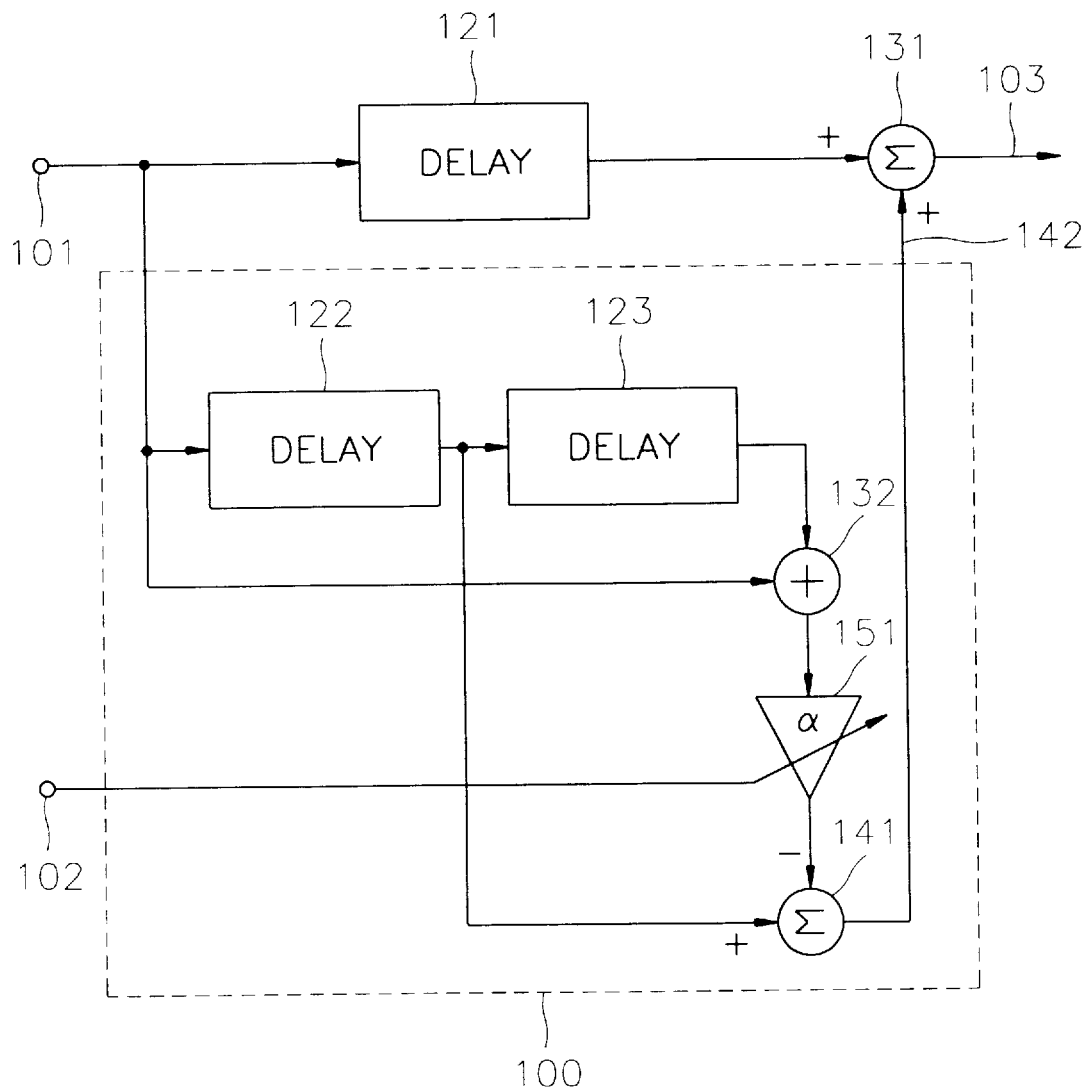
FIG. 1 is a block diagram of a conventional video signal peaking circuit.
Figure 2:
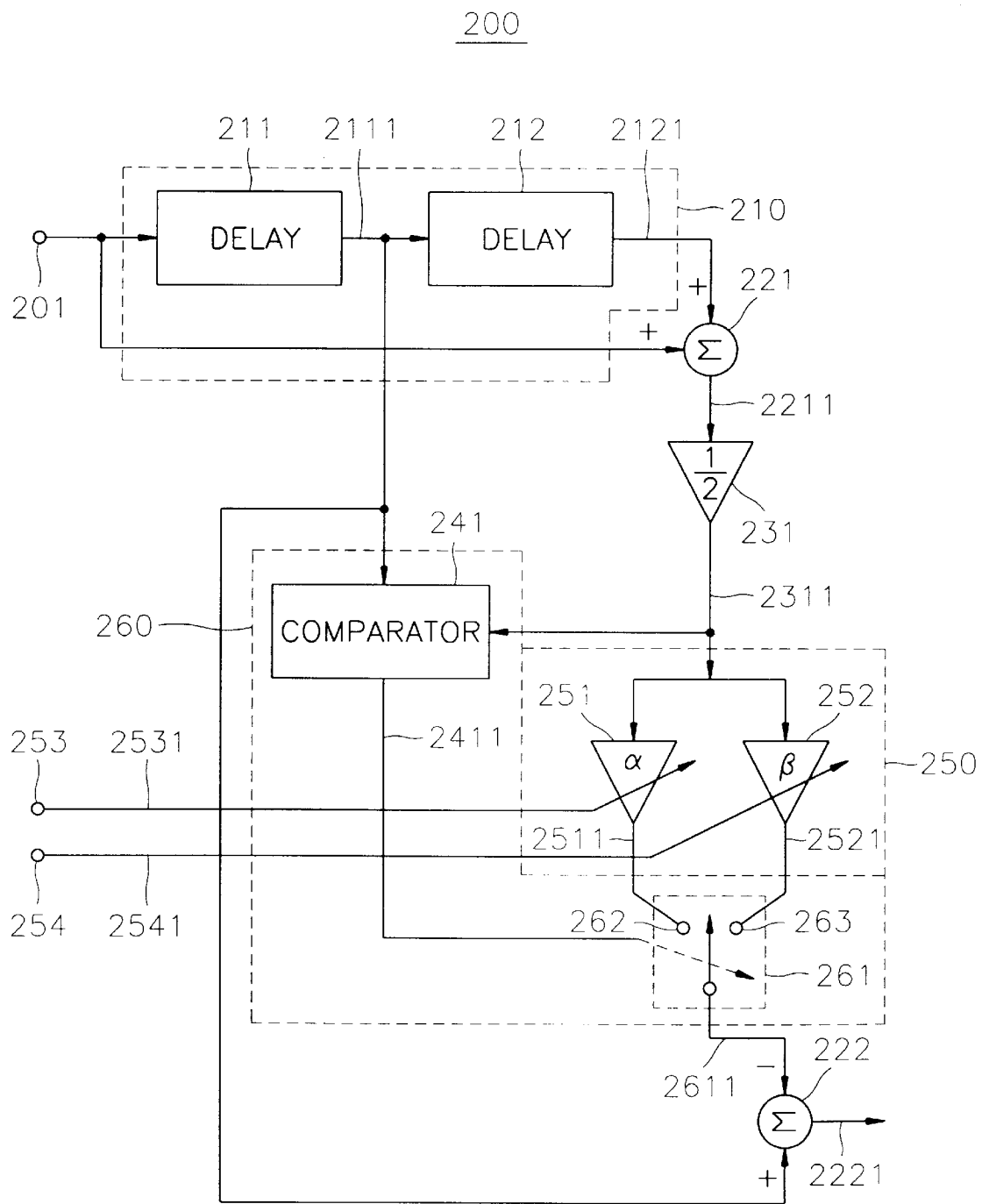
FIG. 2 is a block diagram of a video signal peaking circuit according to the present invention.

FIG. 2 shows a video signal peaking circuit 200 according to one embodiment of the invention. In FIG. 2, the video signal peaking circuit 200 includes a delay circuit 210, an adder 221, a variable amplifying section 250, a selection section 260, and a subtracter 222.

Delay circuit 210 consists of a first delay section 211 and a second delay section 212. First delay section 211 delays a luminance signal which is inputted through a luminance signal input terminal 201 for a predetermined time T so that a first delayed signal 2111 is generated at an output terminal therein. The first delayed signal 2111 generated by first delay section 211 is provided to second delay section 212 and selection section 260. Second delay section 212 delays the first delayed signal for a predetermined time which is preferably time T, thereby generating a second delayed signal 2121 delayed for time 2T. The second delayed signal 2121 is provided to adder 221.

Adder 221 adds the second delayed signal from second delay section 212 to a current luminance signal through the luminance signal input terminal 201 to generate an added signal 2211, which is provided to a one-half amplifier 231. One-half amplifier 231 amplifies the added signal 2211 to develop an ½ amplified signal 2311 and outputs the ½ amplified signal 2311 to variable amplifying section 250 and selection section 260.

Variable amplifying section 250 includes a first variable amplifier 251 and a second variable amplifier 252. First variable amplifier 251 amplifies the ½ amplified signal 2311 from one-half amplifier 231 in response to a first control signal 2531 which is provided from an exterior through a first control input terminal 253, thereby generating a first variable amplified signal 2511. Second variable amplifier 252 amplifies ½ amplified signal 2311 from one-half amplifier 231 in response to a second control signal 2541 which is provided from the exterior through a second control input terminal 254, thereby generating a second variable amplified signal 2521.

The selection section 260 selectively outputs first or second variable amplified signal 2511 and 2521 based on ½ amplified signal 2311 of one-half amplifier 231. Selection section 260 preferably includes a comparator 241 and a switch 261 for selectively outputting the first or the second variable amplified signal 2511 or 2521. The comparator 241 compares a voltage level of ½ amplified signal 2311 with the voltage level of a reference signal provided from the exterior, preferably the first delayed signal 2111 from first delay section 2111, and provides the comparison result thereof to the switch 261 so as to control a switching operation of the switch 261. Switch 261 is operated according to comparison result 2411 provided from comparator 241, thereby selecting one of first and second variable amplified signals 2511 and 2521 and outputting the selected signal by switching to the subtractor 222.

Subtractor 222 subtracts first or second variable amplified signals 2511 or 2521 provided from switch 261 from first delayed signal 2111 provided from first delay section 211, thereby developing a peaking signal 2221.

The operation of the embodiment according to the invention is described in detail with reference to FIGS. 2 and 3A through 3K.

In FIG. 2, when a luminance signal, which has a waveform as shown in FIG. 3A and is separated by a luminance and chroma signal separating apparatus (not shown), is provided to first delay section 211 through luminance signal input terminal 201, first delay section 211 delays the inputted luminance signal for the predetermined time T to generate a first delayed signal 2111, as shown in FIG. 3B, and provides first delayed signal 2111 to second delay 212, comparator 241, and subtracter 222.

Second delay section 212 delays once more first delayed signal 2111 for the predetermined time T, in the same manner as the operation of first delay section 212 to generate second delayed signal 2121, as shown in FIG. 3C, and provides second delayed signal 2121 to adder 221. Adder 221 adds second delayed signal 2121 to a current luminance signal through luminance input terminal 201 to generate an added signal 2211, as shown in FIG. 3D, and provides one-half amplifier 231 with added signal 2211.

One-half amplifier 231 amplifies added signal 2211 from adder 221 at the rate of one-half to generate a ½ amplified signal 2311, as shown in FIG. 3E, and provides ½ amplified signal 2311 to comparator 241, first variable amplifier 251, and second variable amplifier 252.

First variable amplifier 251 amplifies ½ amplified signal 2311 from one-half amplifier 231 in response to first control signal 2531 through first control input terminal 253, thereby generating first amplified signal 2511, and provides first amplified signal 2511 to a first input terminal 262 of the switch 261. For example, when ½-amplified signal 2311, as shown in FIG. 3E, generated by one-half amplifier 231 is inputted to first variable amplifier 251, and the rate of amplifying of the first variable amplifier 251 is one-fifth, the first variable amplifier ⅕-amplifies the ½-amplified signal and outputs a ⅕-amplified signal as first amplified signal 2511 to first input terminal 262 of switch 261.

Further, second variable amplifier 252 amplifies ½-amplified signal from one-half amplifier 231 in response to the second control signal through second input terminal 254 to generate a second amplified signal 2521, and provides second amplified signal 2521 to a second input terminal 263 of switch 261. For example, when ½-amplified signal 2311, which has a waveform as shown in FIG. 3E, and is generated by one-half amplifier 231 is inputted to second variable amplifier 252, and the rate of amplifying of the second variable amplifier 252 is four-fifths, the second variable amplifier 4/5-amplifies ½-amplified signal 2311 and outputs a ⅘-amplified signal as second amplified signal 2521 to second input terminal 263 of switch 261.

Comparator 241 compares ½-amplified signal 2311 from one-half amplifier 231 with first delayed signal 2111 from first delay 211 to generate a signal of the comparison result, and provides the signal of the comparing result for switch 261 to control switch 261. For example, when a first delay signal, which has a waveform as shown in FIG. 3B and is from first delay 211, and an ½-amplified signal, as shown in FIG. 3E, from one-half amplifier 231 are respectively inputted to both input terminals of comparator 241, comparator 241 outputs a logic signal as a signal to control switch 261. The logic signal outputted from comparator 241 is depicted in FIG. 3H. That is, when the level of first delayed signal 2111 is lower than that of ½-amplified signal 2311, comparator 241 provides a low logic signal to switch 261. In contrast, when the level of first delayed signal 2111 is higher than that of ½-amplified signal 2311, comparator 241 provides the high logic signal to switch 261.

Switch 261 operates in response to the logic state of the logic signal provided from comparator 241 so that switch 261 selectively outputs first amplified signal 2511 or second amplified signal 2521 to the subtracter 222. For example, when a low logic signal 2411 from comparator 241 is provided to switch 261, switch 261 switches on first input terminal 262 thereof thereby outputting first amplified signal 2511 from first variable amplifier 251 to subtracter 222. In contrast, when a high logic signal from comparator 241 is provided to switch 261, switch 261 switches on second input terminal 263 thereof, thereby outputting second amplified signal 2521 from second variable amplifier 252 to subtracter 222.

FIG. 3I is a waveform of the signal which is outputted from the switch 261 when first amplified signal 2511 as shown in FIG. 3F, second amplified signal 2521 having a waveform as shown in FIG. 3G, and the logic signal which is a comparing result of comparator 241 depicted in FIG. 3H, are respectively inputted to switch 261.

When signal 2611, which has a waveform as shown in FIG. 3I and is developed by switch 261, is provided to subtracter 222, subtracter 222 subtracts signal 2611 from first delayed signal 2111, which is provided from first delay 211, so that a peaking signal 2221, as shown in FIG. 3J, is developed.

The peaking signal of FIG. 3J has a preshooting portion (α) and a overshooting portion (β) which can be controlled according to each amplification rates of first variable amplifier 251 and second variable amplifier 252, respectively.

Peaking signal 2221, which is shown in FIG. 3J, and is generated by subtracter 222, is added to a delayed signal, which is preferably second delayed signal 2121 generated by the second delay section 212 so as to generate a peaked video signal such as the one shown in FIG. 3K. Therefore, by the embodiment of the present invention, each of the degrees of the preshooting and the overshooting portion of the peaking signal which is used to peak video signal can be controlled.

As described previously, the present invention has an advantage that it can control the preshooting portion and the overshooting portion of the peaking signal used to peak video signals.

The invention may be embodied in other specific forms without departing from the spirit or essential characteristics thereof. The present embodiment is therefore to be considered in all respects as illustrative and not respective, the scope of the invention being indicated by the appended claims rather than by the foregoing description, and all changes which come within the meaning and the range of equivalency of the claims are therefore intended to be embraced therein.

What is claimed is:

1. A circuit for peaking video signals, said circuit comprising:

a delay section for delaying a luminance signal for a first predetermined time in order to generate a first delayed signal and for delaying the first delayed signal for a second predetermined time in order to generate a second delayed signal;

an adder for adding the second delayed signal to a current video signal in order to generate an added signal;

a variable amplifying section for amplifying the added signal in response to a first control signal from an exterior in order to generate a first variable amplified signal, and amplifying the added signal in response to a second control signal from the exterior in order to generate a second variable amplified signal;

a selecting section for comparing the added signal from said adder with a reference signal, and for selecting the first amplified signal or the second amplified signal according to the comparison result; and a subtracter for subtracting the first amplified signal or the second amplified signal from said select section from the first delayed signal from said delay section in order to generate a subtracted signal as a peaked video signal.

2. A circuit as recited in claim 1, wherein said delay section includes a first delay section for delaying a video signal for the first predetermined time in order to generate the first delayed signal, and a second delay section for delaying the first delayed signal for the second predetermined time in order to generate the second delayed signal.

3. A circuit as recited in claim 1, wherein said variable amplifying section includes a first variable amplifier for amplifying the added signal from said adder in response to the first control signal, and a second variable amplifier for amplifying the added signal from said adder in response to the second control signal.

4. A circuit as recited in claim 1, wherein said selection section includes a comparator for comparing the added signal from said adder with the reference signal, and a switch for selecting the first variable amplified signal or the second variable amplified signal according to the comparison result.

5. A circuit as recited in claim 4, wherein said comparator generates a high logic or a low logic signal according to the comparison result and provides said switch with the logic signal.

6. A circuit as recited in claim 1, wherein the reference signal is the first delayed signal generated by said delay section.

7. A circuit as recited in claim 1, further comprising: an amplifier for amplifying the added signal from said adder in order to generate an amplified signal, and for providing the amplified signal to said select section and said amplifying section.

8. A circuit for peaking video signals, said circuit comprising:

a first delay means for delaying an input luminance signal for a first predetermined time in order to generate a first delayed signal;

a second delay means for delaying the first delayed signal for a second predetermined time in order to generate a second delayed signal;

an adder for adding said second delayed signal to a current input luminance signal in order to generate an added signal;

a first amplifier for amplifying the added signal in order to generate a first amplified signal;

a comparator for comparing the first amplified signal from the first amplifier with a reference signal;

a first variable amplifier for amplifying the first amplified signal according to a first control signal in order to generate a second amplified signal;

a second variable amplifier for amplifying the first amplified signal according to a second control signal in order to generate a third amplified signal;

a switch for selecting the second or third amplified signal according to the comparison result in order to output the second or the third amplified signal; and a subtracter for subtracting the second or third amplified signal selected by said switch from the first delay signal from said first delay means, thereby generating a subtracted signal as peaked video signal.

9. A circuit as recited in claim 8, wherein said comparator generates a high logic signal or a low logic signal according to the comparison result and provides the high logic or the low logic signal to said switch.

10. A circuit as recited in claim 8, wherein the reference signal is the first delay signal generated by said delay section.

* * * * *